UNITED STATES PATENT OFFICE.

ERNST WIRTH, OF DORTMUND, GERMANY.

PROCESS OF PURIFYING ANTHRACENE.

SPECIFICATION forming part of Letters Patent No. 685,895, dated November 5, 1901.

Application filed August 29, 1900. Serial No. 28,470. (No specimens.)

*To all whom it may concern:*

Be it known that I, ERNST WIRTH, chemist, a subject of the German Emperor, residing at 37 Hohenzollerstrasse, Dortmund, Germany, have invented a certain new and useful Improvement in Processes for Purifying Anthracene and Methods for Recovering the Purifying Agent, (Case No. 1,) of which the following is a full, clear, concise, and exact description.

My invention relates to a process for purifying anthracene and methods for recovering the purifying agent.

The separation from the anthracene of the carbazole found in considerable quantities in many crude anthracenes cannot be effected by recrystallation from coal-tar oil, for instance, because of the slight solubility of the carbazole. The processes for separating carbazole from crude anthracene by washing the latter with solvents of carbazole—such as pyridin, (German Patent No. 42,063,) acetone, (German Patent No. 78,861,) or liquid ammonia, (British Specification No. 27,559 of 1898)—have the disadvantage that anthracene is dissolved together with the carbazole, and the two cannot afterward be separated. The process which depends on the conversion of the carbazole into its potassium compound by the action of caustic potash (German Patent No. 111,359) is not easy, because of the high temperature required.

The present invention relates to a process for separating carbazole from anthracene by converting the former into its easily-soluble nitroso compound, while the sparingly-soluble anthracene is not attacked by the reagents used. The process has the advantage that the nitrous acid used for forming the nitroso compound can be recovered from the solution obtained and at the same time technically valuable carbazole derivatives may be isolated. Thus this process for separating carbazole from crude anthracene is very cheap, and by it the hitherto nearly unused carbazole is presented for application.

There is used in this invention a new method for producing nitroso-carbazole. Hitherto this compound has been obtained (Zeidler, *Sitzungsbericht d. Kais. Akademie der Wissenschaften in Wien,* 1876, II, page 246; *Annalen d. Chemie,* 191, page 285) by treating carbazole in acetic acid or ether solution under certain conditions with nitrous acid. It has now been found that nitroso-carbazole is easily and smoothly formed if the action of the nitrous acid proceeds in the presence of an indifferent—that is, oxygen-free—solvent. The carbazole may be suspended or dissolved in the liquid. Appropriate solvents are, for example, crude or purified light coal-tar oil, petroleum-benzin, carbon bisulfid, carbon tetrachlorid, or the like. The reaction is not dependent on certain conditions of temperature, as it occurs both in hot and cold solutions. The nitrous acid can be used in one of the known manners either as nitrous anhydrid in a gas mixture or in solution or a nitrite and an inorganic or organic acid. The crude anthracene is suspended in an indifferent liquid or heated therewith until it dissolves and treated with the nitrous acid. The nitroso compounds of carbazole and its homologues, such as phenylnaphthylcarbazole, thus formed dissolve. The solution is then filtered from the high-grade anthracene free from carbazole, which has remained undissolved or has separated on cooling. The filtered solution contains a small proportion of anthracene, all the easily-soluble impurities, like phenanthrene, and all the carbazole, as nitroso-carbazole. The solution can be worked up either directly or after concentration by distilling away a part of the solvent to yield technically valuable carbazole derivatives and nitrous acid. For this purpose the solution may be treated hot with sulfuric acid of specific gravity above 1.3, or cold with sulfuric acid of above 1.7 specific gravity, whereupon the nitrous acid employed is quantitatively eliminated as nitric oxid, while at the same time there is produced the green oxidation product of unknown complex composition insoluble in all solvents, which Zeidler obtained from solid nitroso-carbazole and concentrated sulfuric acid. The elimination of the nitroso group from the nitroso-carbazole solution may be effected also by means of nitric acid. In this case there is formed a nitro compound which is insoluble in all usual solvents, but dissolves in hot nitro-benzene. It does not melt at 330° centigrade and is converted into the corresponding amido compound by the usual reducing agents. It is thus different from the known mononitro-carbazoles; but its relation to carbazole is apparent by the fact that carbazole is formed when the corresponding amido compound is treated with ethyl nitrite. The nitric acid used should have a specific gravity of 1.3 to 1.5. The reaction begins in the cold, but is accelerated by gentle warming and proceeds to completion.

The green oxidation product from nitroso-carbazole can be used for the manufacture of coloring-matters just as the nitro compound can.

The process is carried out as follows:

Example I: One hundred kilos of ground crude anthracene (containing, for example, thirty-two per cent. of anthracene and thirty per cent. of carbazole) are mixed in a vessel provided with a stirrer and a chimney with three hundred kilos of light coal-tar oil and fourteen kilos of sodium nitrite. That is one hundred and ten per cent. of the calculated amount. While continuously stirring, a quantity of dilute sulfuric acid of sixteen-per-cent. strength, equivalent to the sodium nitrite, is added in small portions so gradually that no violent reaction occurs. The small quantity of nitrous gas which is evolved is mixed with air and water to be recovered as nitrous acid. When the reaction is completed, the sodium sulfate formed is dissolved by addition of water and separated and the high-grade anthracene is filtered from the coal-tar oil, washed with benzene, and dried. The solution filtered from the anthracene and containing the nitroso-carbazole is cooled and then are added twenty-eight kilos of nitric acid of specific gravity 1.36. The mixture is stirred and, if necessary, gently warmed to complete the reaction. The nitrous gas evolved is either recovered as nitrous acid in the manner indicated above or mixed with air and used for purifying another batch of the crude anthracene, as directed in Example II. The nitro compound produced is separated from the coal-tar oil and nitric acid, washed with water, and dried.

Example II: One thousand kilos of thirty per cent. crude anthracene are dissolved in the smallest possible quantity (about three thousand kilos) of hot benzene in a boiler provided with a cooler and under a hood. If the anthracene contains moisture, it is distilled to separate the water. Next a finely-divided current of dry nitrous-acid gas (obtained by mixing nitric oxid with sufficient air) is introduced until all the carbazole has become nitroso-carbazole. After cooling the anthracene is filtered off, washed with benzene, and dried. The solution containing the nitroso-carbazole is heated with sulfuric acid of specific gravity 1.5 in quantity amounting to three times the weight of the nitroso-carbazole, whereby all the nitroso-carbazole is converted into the green compound described above. The nitric oxid evolved is conducted into a gas-holder and used as nitrous-acid gas, as described above. The green compound is isolated by filtration and washing. The coal-tar oil remaining can be used again either directly or after distillation. The acid can also be used again after it has been brought to the right degree of concentration.

The anthracene obtained according to these two examples has a purity of seventy-five to ninety-five per cent., according to the quality of the crude anthracene. If the carbazole derivative is to be obtained of greater purity, the crude anthracene may be freed from the more easily soluble constituents before it is worked up. The nitroso-carbazole may be obtained as such from its solution in a pure condition by distilling the solvent and recrystallizing.

The process is also applicable for working up the residues containing carbazole from other purifying treatment of anthracene, whereby high-grade anthracene and carbazole derivatives may be obtained.

Having now particularly described and ascertained the nature of my said invention and the manner in which the same is to be performed, I declare that what I claim is—

1. A process for separating carbazole and its homologues from crude anthracene by suspending the crude anthracene in an indifferent solvent which dissolves anthracene very slightly but dissolves nitroso-carbazoles easily, and then treating this mixture with nitrous acid, substantially as described.

2. A process for separating carbazole and its homologues from crude anthracene by suspending the crude anthracene in an indifferent solvent which dissolves anthracene very slightly but dissolves nitroso-carbazole easily, and then treating this mixture with nitrous acid, separating the solution of nitroso-carbazole, obtained by this treatment, from the undissolved anthracene and splitting off nitric oxid from the solution of nitroso-carbazole by acids, the nitric oxid being converted into nitrous acid which is again used for treating further portions of crude anthracene, substantially as described.

In witness whereof I hereunto subscribe my name this 7th day of August, A. D. 1900.

ERNST WIRTH.

Witnesses:
WILLIAM ESSENWEIN,
PETER LIEBER.